(12) United States Patent
Aswani et al.

(10) Patent No.: US 12,475,211 B2
(45) Date of Patent: Nov. 18, 2025

(54) BASIC AUTHENTICATION USING IDENTITY AND ACCESS MANAGER WITH API KEY

(71) Applicant: Rakuten Symphony, Inc., Tokyo (JP)

(72) Inventors: Manoj Aswani, Indore (IN); Hemant Sharma, Indore (IN); Ayus Kumar, Indore (IN); Tejaswini Malli, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,084

(22) PCT Filed: Nov. 21, 2022

(86) PCT No.: PCT/US2022/050556
§ 371 (c)(1),
(2) Date: Dec. 21, 2022

(87) PCT Pub. No.: WO2024/112318
PCT Pub. Date: May 30, 2024

(65) Prior Publication Data
US 2024/0311465 A1    Sep. 19, 2024

(51) Int. Cl.
*G06F 21/45*      (2013.01)
*H04L 9/08*       (2006.01)

(52) U.S. Cl.
CPC ............... *G06F 21/45* (2013.01); *H04L 9/08* (2013.01)

(58) Field of Classification Search
CPC .................................. G06F 21/45; H04L 9/08
See application file for complete search history.

(56) References Cited

U.S. PATENT DOCUMENTS

| 8,397,077  | B2 * | 3/2013  | Hoey ................... H04L 63/0807 713/184 |
| 9,479,509  | B2 * | 10/2016 | Zeuthen ................ G06F 21/629 |
| 10,069,817 | B2 * | 9/2018  | Forguson .............. H04L 63/083 |
| 10,237,258 | B2 * | 3/2019  | Maresh ................... H04L 63/08 |
| 10,264,450 | B2 * | 4/2019  | Vicente Ruggiero ....................... H04L 9/0863 |
| 10,567,375 | B1 * | 2/2020  | Mossler ................ H04L 63/101 |
| 10,599,828 | B2 * | 3/2020  | Maresh ................... G06F 21/36 |
| 11,283,789 | B2 * | 3/2022  | Pattar ................. H04L 63/0876 |

(Continued)

OTHER PUBLICATIONS

International Search Report issued Mar. 24, 2023 in International Application No. PCT/US22/50556.

(Continued)

*Primary Examiner* — Viral S Lakhia
(74) *Attorney, Agent, or Firm* — Sughrue Mion, PLLC (57) ABSTRACT

A method, apparatus, and computer-readable recording medium for authenticating a client application using two-factor authentication. The method includes receiving, from the client application, a request to access an application programming interface (API), validating, using a first authentication method, the client application for accessing the API, and based on a result of the validating using the first authentication method, validating the client application for accessing the API using a second authentication method, and providing a response to the client application based on the validating using the first authentication method and the second authentication method.

15 Claims, 6 Drawing Sheets

(56) References Cited

U.S. PATENT DOCUMENTS

| | | | | |
|---|---|---|---|---|
| 11,853,463 | B1* | 12/2023 | Hinrichs | G06F 21/629 |
| 11,922,239 | B1* | 3/2024 | Vasudevan | G06F 9/547 |
| 2018/0063564 | A1* | 3/2018 | Phatak | H04N 21/4753 |
| 2018/0332020 | A1* | 11/2018 | Asano | H04L 63/12 |
| 2018/0357638 | A1* | 12/2018 | Wang | H04L 9/3247 |
| 2019/0065731 | A1* | 2/2019 | Brocious | H04L 63/0838 |
| 2022/0303257 | A1* | 9/2022 | Bhansali | H04L 63/0876 |
| 2023/0018767 | A1* | 1/2023 | Singh | H04L 63/068 |
| 2023/0153426 | A1* | 5/2023 | Grobelny | G06F 21/602 |
| | | | | 726/22 |
| 2023/0185894 | A1* | 6/2023 | Sorensen | H04L 9/3073 |
| | | | | 726/7 |
| 2023/0216681 | A1* | 7/2023 | Azaria | H04L 9/3213 |
| | | | | 726/9 |
| 2023/0308432 | A1* | 9/2023 | Smolny | H04L 63/102 |

OTHER PUBLICATIONS

Written Opinion issued Mar. 24, 2023 in International Application No. PCT/US22/50556.

* cited by examiner

BASIC AUTHENTICATION USING IDENTITY AND ACCESS MANAGER WITH API KEY

CROSS REFERENCE TO RELATED APPLICATIONS

This application is a National Stage of International Application No. PCT/US2022/050556 filed Nov. 21, 2022.

FIELD

Apparatuses, systems, and methods consistent with example embodiments of the present disclosure relate to authenticating a user, and more specifically, authenticating a user using a basic authentication combined with an application program interface (API) Key authentication.

BACKGROUND

In related art, a user is authenticated using basic authentication (e.g., OAuth 2.0). However, using basic authentication, a user may be granted access to all application program interfaces (APIs), programs, files, data, etc., which are categorized under the basic authentication. In related art, there is no way to restrict the user from accessing specific APIs, data, files, etc. Further, in related art, basic authentication is not combinable with a centralized Identity and Access Management (IAM). Thus, a combination of basic authentication and API Key authentication is not available in related art. Similarly, in related art, a combination of basic authentication with a client subscription is not available.

SUMMARY

According to embodiments, systems and methods are provided for authenticating a user using a combination of basic authentication and API Key authentication. A method, performed by at least one processor of a computing device, for authenticating a user using basic authentication and API Key authentication, includes:

According to one or more embodiments, there is provided a method, performed by at least one processor, for authenticating a client application using two-factor authentication, the method including: receiving, from the client application, a request to access an application programming interface (API); validating, using a first authentication method, the client application for accessing the API; based on a result of the validating using the first authentication method, validating the client application for accessing the API using a second authentication method; and providing a response to the client application based on the validating using the first authentication method and the second authentication method.

The first authentication method may include a basic authentication method, and wherein the second authentication method may include validating using an API Key.

The basic authentication method may include determining whether a username and password match an entry in a password database.

The validating using the API Key may include determining whether a valid subscription exists for the API in response to validating the client application using the first authentication method.

The validating using the API Key may include determining whether the API Key is expired in response to determining that a valid subscription exists for the API and validating the client application using the first authentication method.

The providing the response to the client application may include providing a message indicating the client application is not authenticated in response to determining that the client application is not valid based on at least one of the first authentication method and the second authentication method.

The providing the response to the client application may include providing a service response from a backend service in response to determining that the client application is valid based on the first authentication method and the second authentication method.

The validating using the first authentication method may include accessing a first cache, and wherein the validating using the second authentication method may include accessing a second cache.

According to one or more embodiments, there is provided an apparatus for authenticating a client application using two-factor authentication including: a memory storing instructions; and at least one processor configured to execute the instructions to: receive, from the client application, a request to access an application programming interface (API); validate, using a first authentication, the client application for accessing the API; based on a result of the validating using the first authentication, validate the client application for accessing the API using a second authentication; and provide a response to the client application based on the validating using the first authentication and the second authentication.

The first authentication may include a basic authentication, and wherein the second authentication may include validating using an API Key.

The at least one processor may be further configured to determine whether a username and password match an entry in a password database.

The at least one processor may be further configured to determine whether a valid subscription exists for the API in response to validating the client application using the first authentication.

The at least one processor may be further configured to determine whether the API Key may be expired in response to determining that a valid subscription exists for the API and validating the client application using the first authentication.

The at least one processor may be further configured to provide a message indicating the client application is not authenticated in response to determining that the client application is not valid based on at least one of the first authentication and the second authentication.

The at least one processor may be further configured to provide a service response from a backend service in response to determining that the client application is valid based on the first authentication and the second authentication.

The at least one processor may be further configured to: access a first cache to validate using the first authentication, and access a second cache to validate using the second authentication.

According to one or more embodiments, there is provided a non-transitory computer-readable recording medium having recorded thereon instructions executable by at least one processor, for authenticating a client application using two-factor authentication, the method includes: receiving, from the client application, a request to access an application programming interface (API); validating, using a first authentication method, the client application for accessing the API; based on a result of the validating using the first authentication method, validating the client application for accessing the API using a second authentication method; and providing a response to the client application based on the validating using the first authentication method and the second authentication method.

The first authentication may include a basic authentication, and wherein the second authentication may include validating using an API Key.

The basic authentication method may include determining whether a username and password match an entry in a password database.

The validating using the API Key may include determining whether a valid subscription exists for the API in response to validating the client application using the first authentication method.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which basic authentication is combined with API Key authentication. As a result, security is increased by requiring both basic authentication and API Key authentication. Further, processing time is reduced by performing the basic authentication before the API Key authentication.

Figure 1:
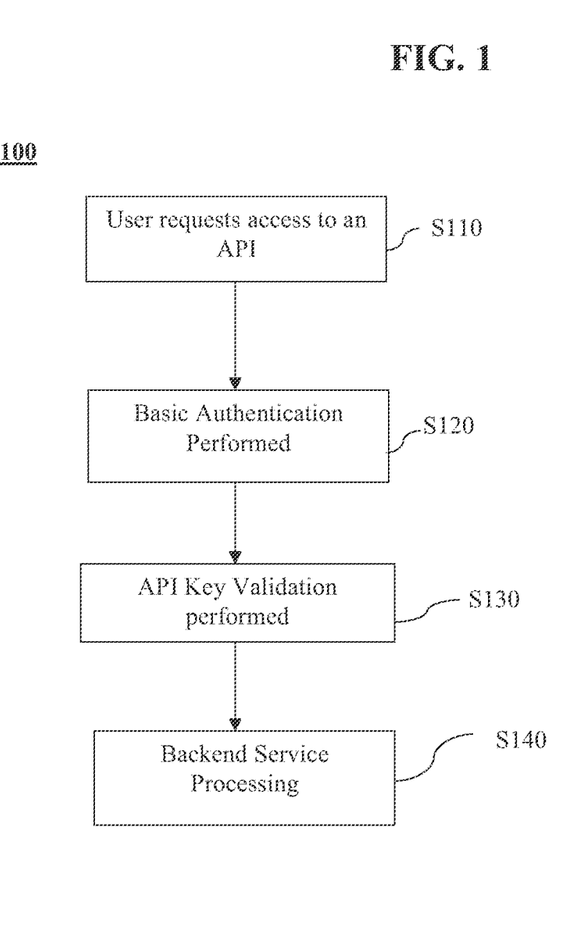
FIG. 1 illustrates a flowchart of a method 100 for authenticating a user using basic authentication and API Key authentication, according to an embodiment.

FIG. 1 illustrates a flowchart of a method 100 for authenticating a user using basic authentication and API Key authentication, according to an embodiment. The method 100 of FIG. 1 may be performed by at least one processor executing instructions stored in at least one memory.

Referring to FIG. 1, at operation S110, a user of a client application requests access to an API. For example, the request is forwarded from a client application to an API gateway. At operation S120, a basic authentication is performed. For example, the user provides a username and password to confirm that the user has a basic credential for accessing the API. If the basic credentials are validated, then another authentication is performed using an API Key. The API Key may be a string of characters. At operation S130, an API Key validation is performed. During the API Key validation, it is determined whether the key is expired and whether there is a valid subscription for the API Key. If both the basic authentication and API Key authentication are validated, then at operation S140, a service request is forwarded from an API gateway to a backend service (e.g., an application or microservice), resulting in a response received at the API gateway from the application or microservice. If the authentication is found to be invalid at any step of the process, the response received at the client application will be an unauthentication message.

Figure 2A:
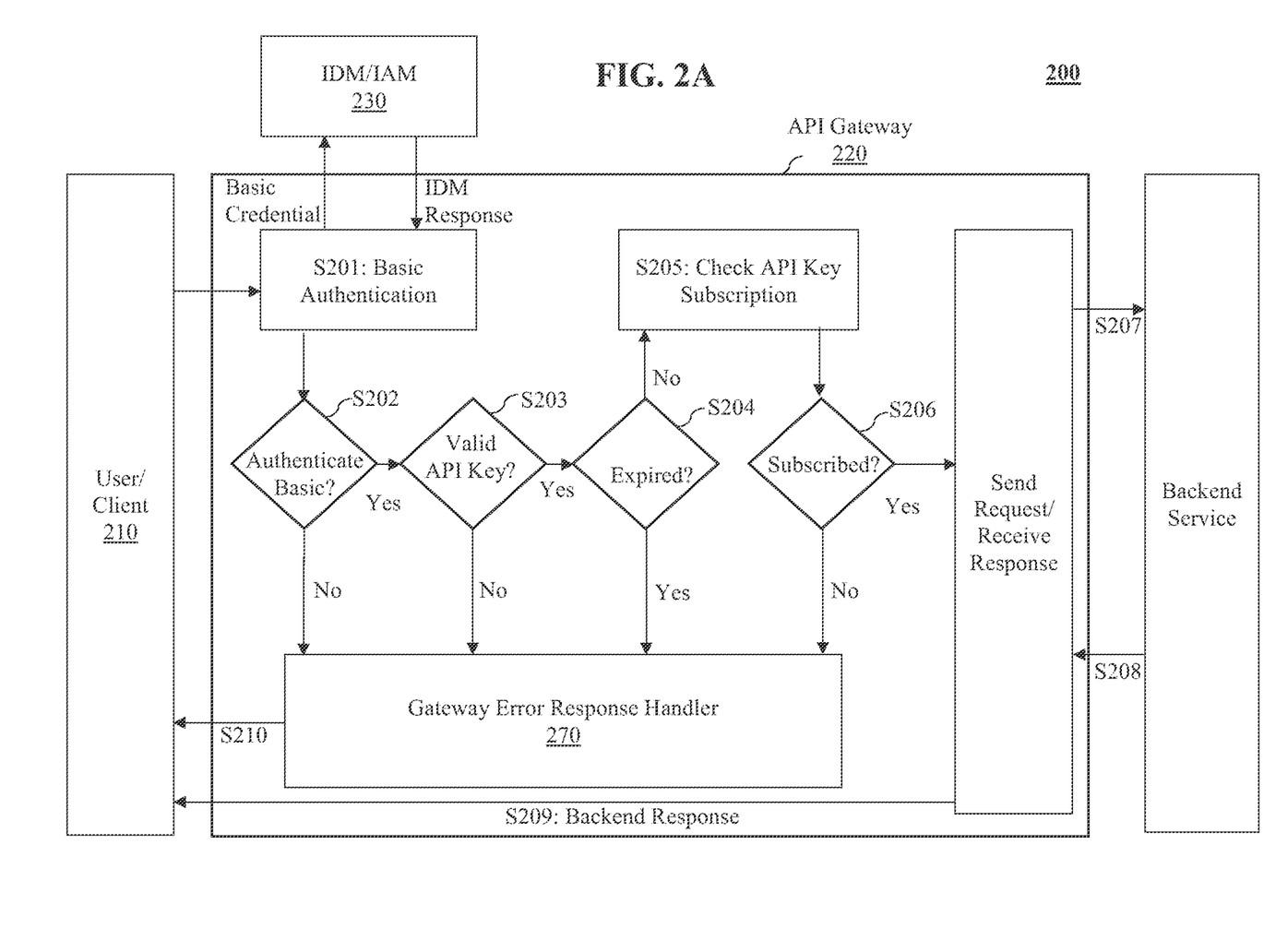
FIGS. 2A and 2B illustrate flowcharts of one or more methods of authenticating a user using basic authentication and API Key authentication, according to embodiments.

FIG. 2A illustrates a flowchart of a method 200 for authenticating a user, according to an embodiment. In this process there is sequential authentication of a basic authentication and an API Key authentication process. Further, the method 200 of FIG. 2A may be performed by at least one processor executing instructions stored in at least one memory.

At step S201, basic authentication is performed. A service request for authentication is received at the API gateway 220 from a user/client 210. The basic authentication is an individual authentication. For example, the service request may include a basic credential, which may include a username and/or password. The basic credential is sent from the API gateway 220 to a centralized tool (e.g., identity management (IDM)/identity and access management (IAM)). The IDM/IAM tool 230 determines whether the basic credential is authorized and sends a response back to the API Gateway 220 based on the authorization result. At step S202, if there is no basic authentication, then the gateway error response handler 270 will block the service request and send a message to the user 210 indicating that the request is unauthenticated (e.g., step S210). If the basic authentication is validated at step S202, then it is determined at step S203 whether there is a valid API Key. If there is not a valid API Key then the gateway error response handler 270 will block the service request and send a message to the user 210 indicating that the request is unauthenticated (e.g., step S210).

At step S204 it is determined whether the API Key is expired. If it is expired then the gateway error response handler 270 will block the service request and send a message to the user 210 indicating that the request is unauthenticated (e.g., step S210). If the API Key is not expired, at step S205, the API Key subscription is checked. If there is no API Key subscription, then the gateway error response handler 270 will send an unauthenticated message to the user 210 (e.g., step S210). If there is an available API Key subscription (S206—Yes), then a service request is sent to a backend service (e.g., step S207). The backend service may be an application and/or a microservice, but is not limited to this. After processing the service request, at operation S208, the backend service sends a service response to the API gateway 220. At operation S209, the API gateway 220 forwards the service response to the client application 210.

Figure 2B:
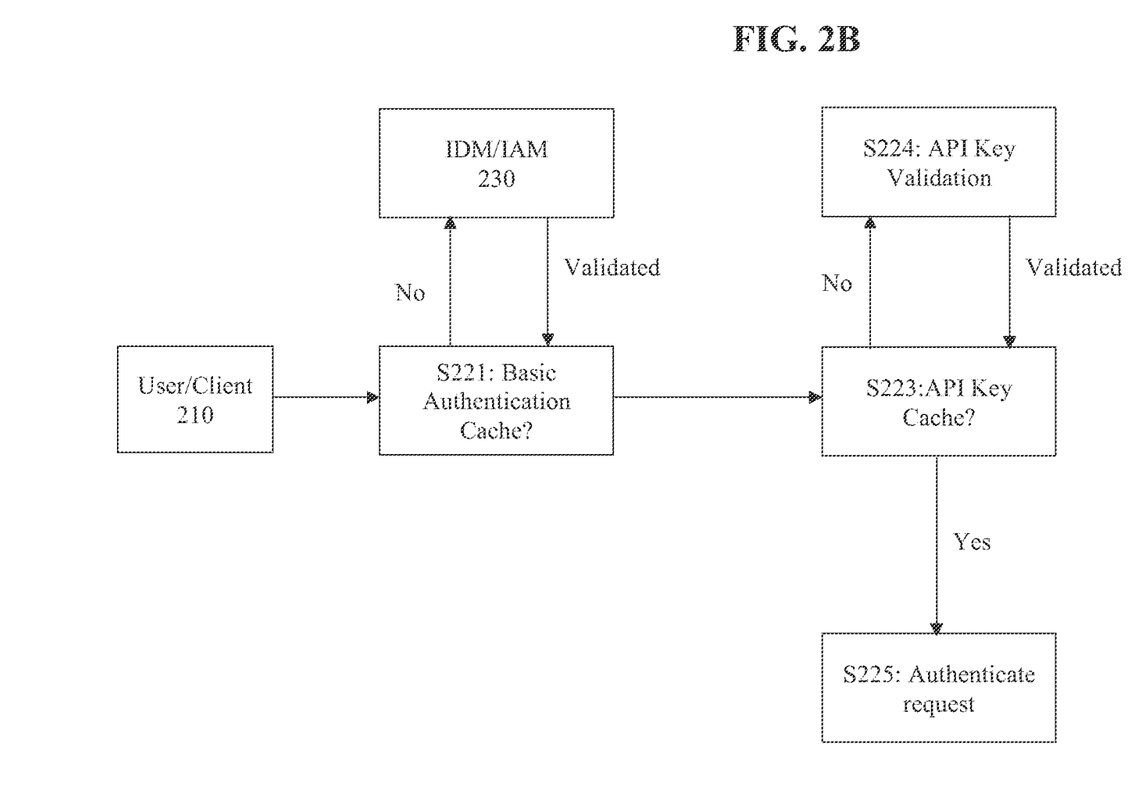

FIG. 2B illustrates a flowchart of a method for authenticating a user using a cache, according to an embodiment. According to an embodiment, the cache may be utilized for basic authentication and API key authentication. Thus, if information is stored in the cache (e.g., basic authentication information and/or API Key authentication information), it is not necessary to query the IDM/IAM tool. Thus, processing time may be reduced by utilizing both a basic authentication cache and an API Key authentication cache. Information may stay in the cache for a predetermined amount of time (e.g., 5 minutes, 15 minutes), which may be configurable by a user/operator. The time in the cache may be different for the basic authentication than the API key authentication. For example, API key cache may be 10 minute and basic authentication cache may be 5 minutes. However, embodiments are not limited to these times.

At step S221, it is determined whether there is a basic credential for basic authentication stored in the basic authentication cache. For example, before an authentication is sent to the IDM/IAM tool 230, the cache may be searched. If the authentication result is retrieved in the cache, the API Key authentication may be performed. If the result is not found in the cache, the IDM tool will be checked, in accordance with step S201 of FIG. 2A.

Next, at step S223, the API Key cache may be searched to determine whether the API Key cache includes the authentication. If no authentication is found, then at step S224, API Key validation is performed. If the API Key authentication result is found in the cache, then the request is authenticated (e.g., step S225). According to an embodiment, once the API Key is validated, the process is similar to operation S206 in FIG. 2A.

Figure 3:
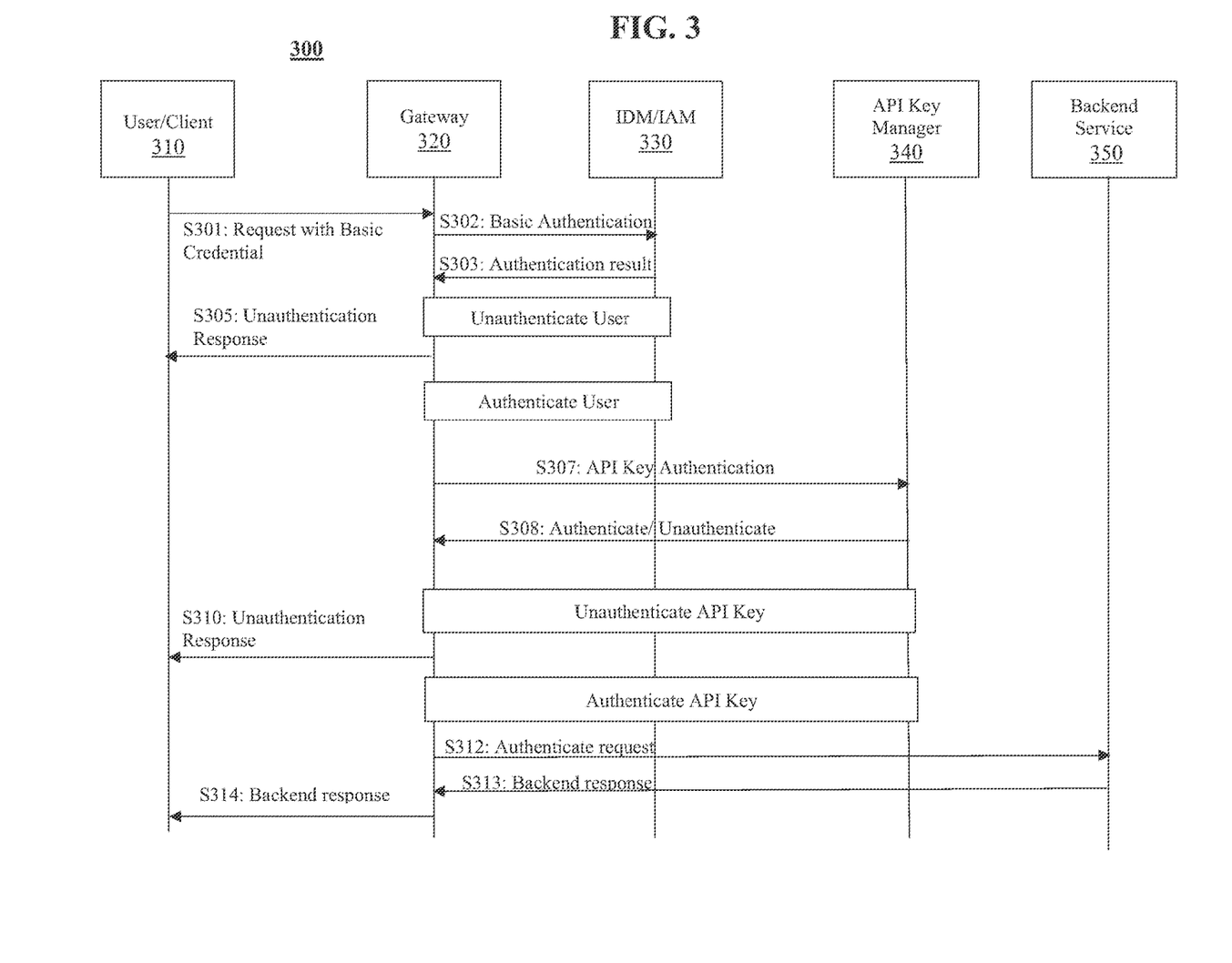
FIG. 3 is a call flow diagram for authenticating a user using basic authentication and API Key authentication, according to an embodiment.

FIG. 3 illustrates a call flow diagram 300 for authenticating a user using a combination basic authentication and API Key authentication, according to an embodiment.

Referring to FIG. 3, at step S301, the user/client 310 sends a request to the API gateway 320 sending a basic credential to the API gateway 320. The basic credential may include a username and/or password. At step S302, basic authentication is performed. For example, the basic authentication information may be sent to an IDM/IAM tool 330 to determine whether the basic authentication information is valid. The IDM/IAM tool 330 sends an authentication result to the gateway 320 (e.g., S303). If the basic authentication information is invalid, then the service request is blocked and a message is sent to the user/client 310 indicating that the request is unauthenticated (e.g., step S305).

According to an embodiment, if the basic authentication information is determined to be valid, then the API Key authentication information is sent to the API Key Manager 340 (e.g., step S307). According to an embodiment, the API Key credential may be a string of characters and numbers. According to an embodiment, the API Key is generated by the gateway. According to an embodiment, the gateway uses the client's information to generate the API Key. The API Key Manager 340 receives the API Key authentication information, determines whether the API Key authentication information is valid, and the API Key manager 340 returns a result of the API Key validation to the gateway 320 (e.g., step S308). If the API Key is not validated, then the service request is blocked and a message is sent to the user 310 indicating that the request is unauthenticated (e.g., step S310).

If the API Key authentication information is validated, then the gateway 320 will forward the service request to backend service 350 (e.g., step S312). The backend service may be an application and/or a microservice, but is not limited to this. At step S313, a service response is forwarded to gateway 320, which is then forwarded from the gateway 320 to the client 310 at step S314.

Figure 4:
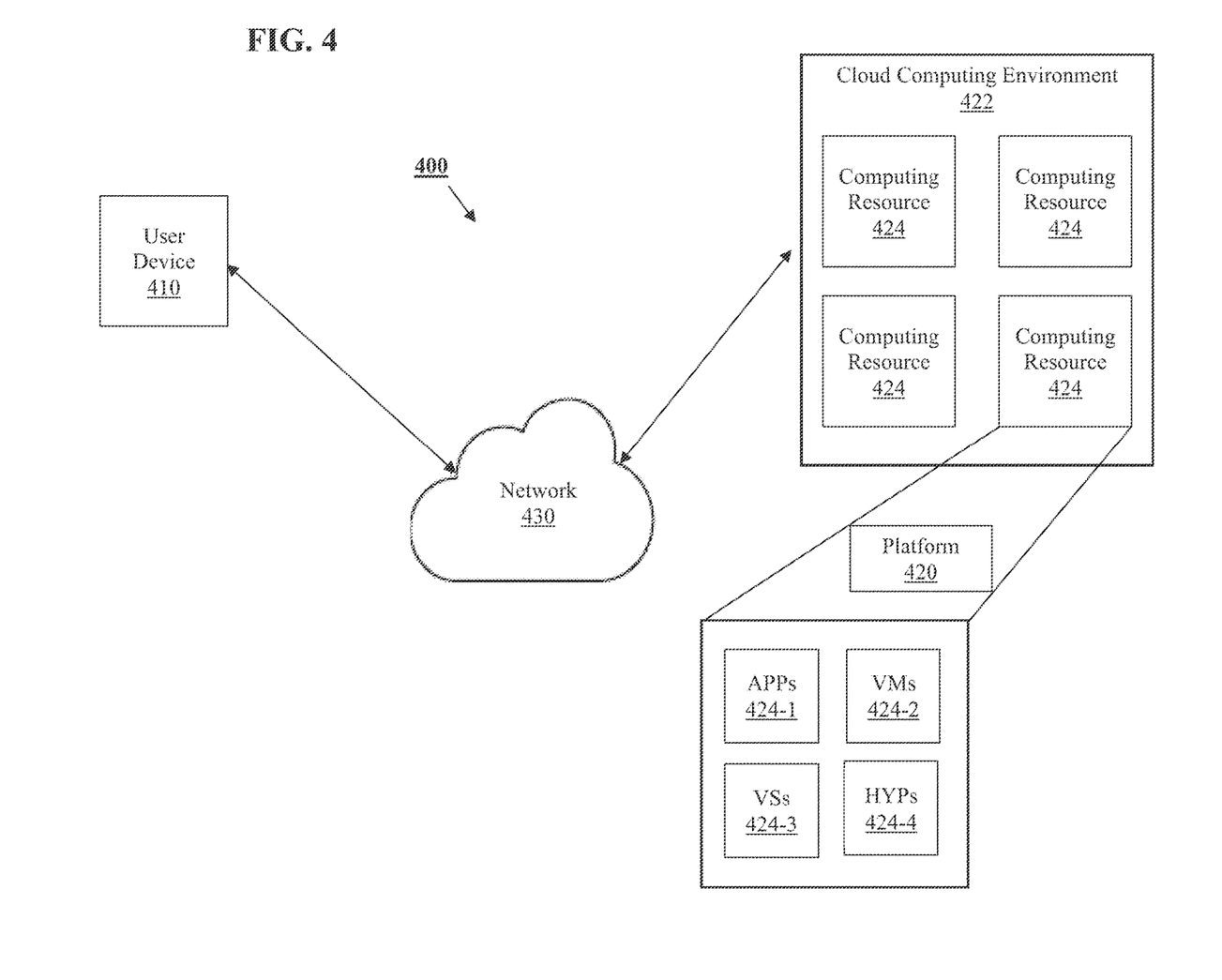
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
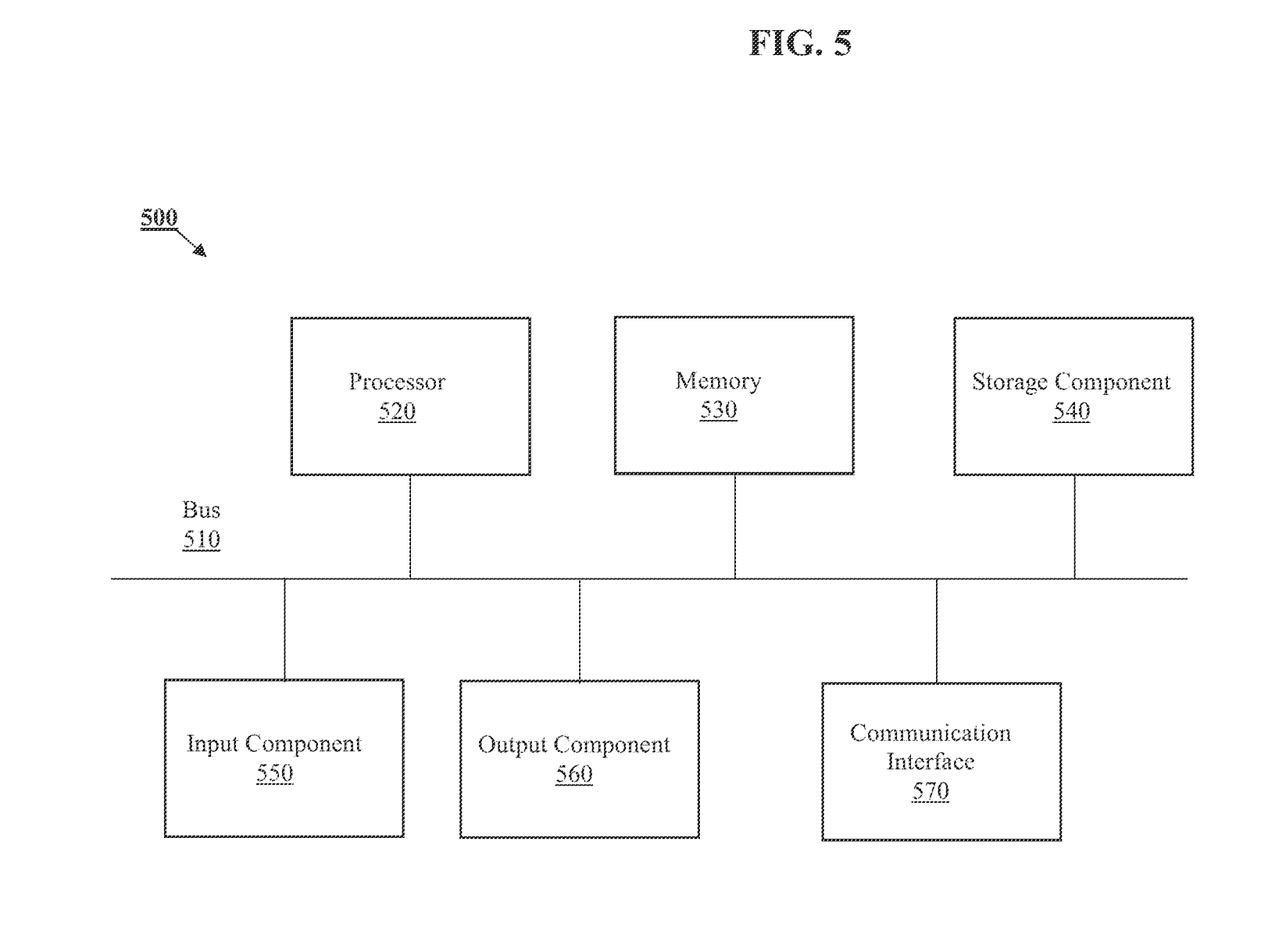
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1, 2, and 3 may be implemented by or using any one of the elements illustrated in FIGS. 4 and 5. It is understood that other embodiments are not limited thereto, and may be implemented in a variety of different architectures (e.g., bare metal architecture, any cloud-based architecture or deployment architecture such as Kubernetes, Docker, OpenStack, etc.).

According to example embodiments, a basic authentication is combined with API Key authentication. With only basic authentication that is not combined with API Key authentication, once a user is authorized using basic authentication, the user is able to access all APIs, programs, data, etc., available under basic authentication. However, by combining basic authentication and API Key authentication, the user may be restricted from accessing specific APIS, programs, data, etc. As a result, security is increased by requiring both basic authentication and API Key authentication. Further, as a result of combining basic authentication and API Key authentication, API throttling on a client level may be performed.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method, performed by at least one processor, for authenticating a client application using two-factor authentication, the method comprising:
   receiving, from the client application, a request to access an application programming interface (API);
   validating, using a first authentication method, the client application for accessing the API, wherein the first authentication method comprises a basic authentication method;
   based on a result of the validating using the first authentication method, validating the client application for accessing the API using a second authentication method, wherein the second authentication method comprises validating using an API Key, and the validating using the API Key comprises determining whether the API Key is expired in response to determining that a valid subscription exists for the API and validating the client application using the first authentication method;
   based on a result of validating using the first authentication method and the second authentication method, sending a service request to a backend service provider; and
   providing a response to the client application based on the validating using the first authentication method and the second authentication method.

2. The method of claim 1, wherein the basic authentication method comprises determining whether a username and password match an entry in a password database.

3. The method of claim 1, wherein the validating using the API Key comprises determining whether the valid subscription exists for the API in response to validating the client application using the first authentication method.

4. The method of claim 1, wherein the providing the response to the client application comprises providing a message indicating the client application is not authenticated in response to determining that the client application is not valid based on at least one of the first authentication method and the second authentication method.

5. The method of claim 1, wherein the providing the response to the client application comprises providing a service response from a backend service in response to determining that the client application is valid based on the first authentication method and the second authentication method.

6. The method of claim 1 further comprising, wherein the validating using the first authentication method comprises accessing a first cache, and
wherein the validating using the second authentication method comprises accessing a second cache.

7. An apparatus for authenticating a client application using two-factor authentication, the apparatus comprising:
a memory storing instructions; and
at least one processor configured to execute the instructions to:
receive, from the client application, a request to access an application programming interface (API);
validate, using a first authentication, the client application for accessing the API, wherein the first authentication comprises a basic authentication;
based on a result of the validating using the first authentication, validate the client application for accessing the API using a second authentication, wherein the second authentication comprises validating using an API Key, and the validating using the API Key comprises determining whether the API Key is expired in response to determining that a valid subscription exists for the API and validating the client application using the first authentication;
based on a result of validating using the first authentication and the second authentication, send a service request to a backend service provider; and
provide a response to the client application based on the validating using the first authentication and the second authentication.

8. The apparatus of claim 7, wherein the at least one processor is further configured to determine whether a username and password match an entry in a password database.

9. The apparatus of claim 7, wherein the at least one processor is further configured to determine whether the valid subscription exists for the API in response to validating the client application using the first authentication.

10. The apparatus of claim 7, wherein the at least one processor is further configured to provide a message indicating the client application is not authenticated in response to determining that the client application is not valid based on at least one of the first authentication and the second authentication.

11. The apparatus of claim 7, wherein the at least one processor is further configured to provide a service response from a backend service in response to determining that the client application is valid based on the first authentication and the second authentication.

12. The apparatus of claim 7 further comprising, wherein the at least one processor is further configured to:
access a first cache to validate using the first authentication, and
access a second cache to validate using the second authentication.

13. A non-transitory computer-readable recording medium having recorded thereon instructions executable by at least one processor, for authenticating a client application using two-factor authentication, the method comprising:
receiving, from the client application, a request to access an application programming interface (API);
validating, using a first authentication method, the client application for accessing the API, wherein the first authentication method comprises a basic authentication method;
based on a result of the validating using the first authentication method, validating the client application for accessing the API using a second authentication method, wherein the second authentication method comprises validating using an API Key, and the validating using the API Key comprises determining whether the API Key is expired in response to determining that a valid subscription exists for the API and validating the client application using the first authentication method;
based on a result of validating using the first authentication method and the second authentication method, sending a service request to a backend service provider; and
providing a response to the client application based on the validating using the first authentication method and the second authentication method.

14. The non-transitory computer-readable recording medium of claim 13, wherein the basic authentication method comprises determining whether a username and password match an entry in a password database.

15. The non-transitory computer-readable recording medium of claim 13, wherein the validating using the API Key comprises determining whether the valid subscription exists for the API in response to validating the client application using the first authentication method.

* * * * *